April 17, 1951  S. D. BRADLEY  2,549,569
TEMPERATURE CONTROL DEVICE
Filed April 26, 1948
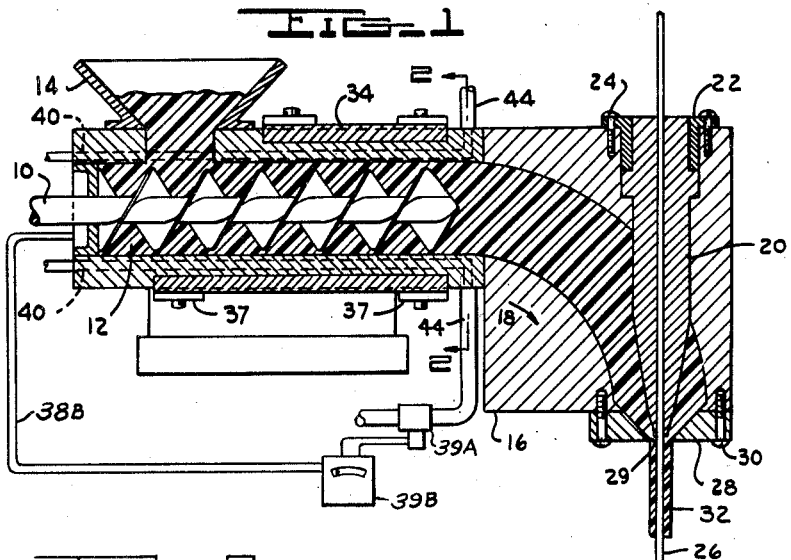
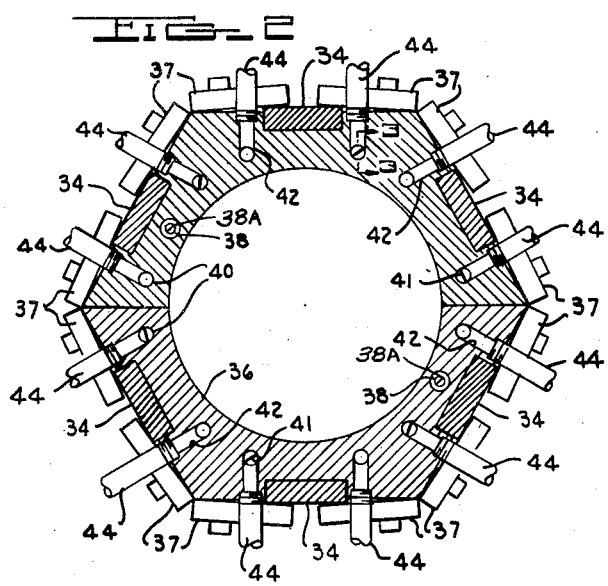
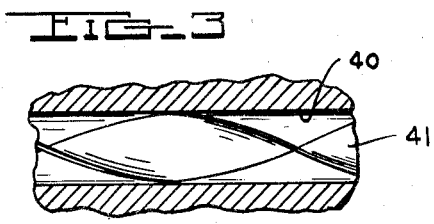
INVENTOR.
STEPHEN D. BRADLEY
BY
*Arthur N. Smith*
ATTORNEY Patented Apr. 17, 1951

2,549,569

UNITED STATES PATENT OFFICE 2,549,569

TEMPERATURE CONTROL DEVICE

Stephen D. Bradley, Detroit, Mich., assignor to Detroit Macoid Corporation, Detroit, Mich., a corporation of Michigan Application April 26, 1948, Serial No. 23,311

6 Claims. (Cl. 18—13)

The present invention relates to a temperature control device for plastic injection or extrusion molding machines, being particularly adapted for use with an injection or extrusion molding head, or for use as a permanent integral part of such equipment.

In the extrusion or injection molding of thermoplastic materials, it frequently is important to maintain the plastic material at a uniform desired temperature within narrow limits so as to maintain the required viscosity of the plastic and to obtain an extruded or molded shape of highest quality. The temperature control is commonly obtained by heating the fabricating head and the plastic material therein. Variations in the plastic or its rate of flow through the fabricating head, or temperature overswings occasioned by the heat control device, frequently result in overheating the plastic. As a consequence, an inferior or improperly molded product is produced. The overheated thermoplastic material also may be permanently discolored or otherwise deteriorated and rendered unsuitable for the intended uses.

Maintenance of a constant temperature in the plastic material within the required limits presents a difficult problem for the heating equipment, which must be designed with sufficient capacity to meet the maximum heating demands of the plastic material flowing through the fabricating head and at the same time must provide means for preventing a temperature overswing when the full heat output of the equipment is not required, as for example during periods of intermittent flow of the plastic through the fabricating head. Prior to the present invention, reliance has been placed upon the skill of the operator of the machine to control the temperatures and to produce the desired product.

Important objects of the present invention are to provide an improved means, which is particularly suited for either manual or automatic thermostatic control for regulating the temperature of the thermoplastic material within a plastic fabricating machine; and to provide means for rapidly removing excess heat from around the plastic material so as to avoid its overheating.

Another object of the present invention is to provide a conveyor conduit for thermoplastic material having improved thermostatically actuated temperature control means for the thermoplastic therein and comprising cooperable heating and cooling means in heat exchange relation with the sidewalls of the conveyor conduit.

Other objects of this invention will appear in the following description and appended claims, reference being had to the accompanying drawings forming a part of this specification wherein like reference characters designate corresponding parts in the several views.

The above and other objects are accomplished in a preferred embodiment of the present invention comprising a conveyor conduit having thermally conductive sidewalls for conveying the thermoplastic material from a feed hopper to the plastic fabricating head, as for example an injection or extrusion molding head. A plurality of electric heating elements in heat exchange relationship with the outer peripheral portions of the conveyor conduit are provided for heating thereof. Between the heating elements and the interior walls of the conduit are a plurality of longitudinally extending coolant ducts for a fluid coolant which is thermostatically caused to flow when the temperature of the conveyor sidewalls exceeds a predetermined maximum allowable limit. A thermostatically actuated control circuit, having its thermosensitive elements embedded in the sidewalls of the conveyor conduit, is provided for regulating the flow of current to the electric heating elements and the flow of fluid coolant through the coolant ducts in accordance with the temperature of the conveyor conduit sidewalls. Thus the temperature of the said conveyor conduit is maintained uniform within narrow limits, regardless of varying operating conditions of the fabricating machine.

In the drawings:

Fig. 1 is a schematic cross section showing an extrusion head and screw-type plastic conveyor mechanism employing the temperature control means of the present invention.

Fig. 2 is an enlarged vertical section through the conveyor conduit, taken in the direction of the arrows along the line 2—2 of Fig. 1, the screw conveyor and plastic material being removed.

Fig. 3 is a fragmentary enlarged longitudinal section through one of the coolant ducts, taken in the direction of the arrows along the line 3—3 of Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is shown by way of example in the drawings. Fig. 1 shows a screw-type plastic feeding or conveyor mechanism wherein a screw 10 feeds the thermoplastic material 12 from the hopper 14 and through the extrusion head 16 in the direction of the arrows 18.

The hollow torpedo 20 forming a part of the extrusion head 16 is removably held in place by the collar 22, which is secured to the body of the head 16 by the plurality of screws 24 and permits passage of a continuous central member, such as for example the wire 26. The removable orifice plate 28 provides the extrusion orifice 29 and is secured to the head 16 by the plurality of screws 30. The plate 28 may be replaced by similar plates having orifices of different sizes and shapes to permit plastic extrusion of various cross sectional contours. The extruded plastic form is shown at 32 as it leaves the extrusion orifice 29.

The heating means for the thermoplastic material comprises a plurality of symmetrically disposed electric strip heaters 34 partially embedded in the two-part conveyor conduit 36 and secured thereto by the screw clamp assembly 37. The sidewalls of the conduit 36 enclose the screw conveyor 10 and are formed of heat conducting material or metal alloy, as for example aluminum or copper, or their alloys. The plastic to be heated flows from the hopper 14 into the tubular cavity of the conduit 36, from whence it is conveyed to the extrusion head 16 by the screw conveyor 10. The sidewalls of the conduit 36 provide small cavities 38 for the thermosensitive elements 38A of a thermostatically actuated control means which includes the electric leads 38B for the elements 38A, the solenoid valve 39A, and the temperature controller 39B. The thermostatically actuated control means may be any conventional type, and it should be understood that each of the coolant supply ducts 44 hereinafter described are controlled as shown in Fig. 1, or if desired, any suitable manifold arrangement may be utilized for controlling the flow of the coolant.

Extending longitudinally within the body of the sidewalls of the conveyor conduit 36 are the plurality of coolant ducts 40, which in the present instance contain the spiral baffle members 41, Fig. 3. The right ends of the longitudinal ducts 40 communicate with the essentially radial coolant ducts 42, which in turn are adapted for connection with the supply ducts 44 of a fluid coolant system, not shown. The left or hopper ends of the ducts 40 open longitudinally into the sidewalls of the conduit 36 and are adapted for connection with a return header, not shown, for the coolant system. The coolant fluid may be either air or other suitable gas under pressure or one of various liquid coolants. Various thermostatically controlled electrical and fluid circuits are available for use with the present invention to regulate the flow of electric current through the heating elements 34 and the flow of coolant through the coolant ducts 40—42 in response to the temperature of the sidewalls of the conduit 36, and are accordingly not described in detail herein.

From the foregoing, it will be seen that I have provided a means for heating a thermoplastic material while closely controlling the temperature thereof within predetermined limits. The device controls the heat generated by the heating elements 34 and also provides a means for rapidly dissipating excess heat generated thereby, thus preventing overheating of the thermoplastic 12. For example, if the thermoplastic material 12 flowing through the conduit 36 is at a lower temperature than desired for fabrication, the thermostat elements within the recesses 38 will call for more heat from the electric heaters 34. The heat generated is transferred to the sidewalls of the conduit 36 and in turn to the plastic material 12. As soon as the sidewalls of the conduit 36 reach the desired temperature which will maintain the plastic material 12 at the optimum temperature for extrusion, the aforementioned thermostatic control means governed by the thermostat elements in the recesses 38 de-energize the electric heaters 34. The residual temperature of the sidewalls 36, particularly near the heating elements 34, will be considerably higher than the plastic 12, so that heat will continue to flow to the latter even after the heaters 34 are de-energized. The excess or residual heat is normally carried away by the continued flow of plastic 12 through the conduit 36. As the temperature of the walls 36 tends to fall below the desired operating temperature, the thermostatic control system will again be actuated to energize the heaters 34.

In the event of an intermittent flow of plastic material 12, the temperature of the sidewalls 36 and of the plastic 12 will immediately begin to rise whenever the flow of the latter stops. In this situation, even after the thermostatic control means has de-energized the heaters 34, the residual heat within the sidewalls of the conduit 36 will continue to heat the plastic 12. Without a provision to the contrary, the latter may be rendered unsuitable for extrusion or permanently damaged. By virtue of the present invention, as soon as the temperature of the conduit 36 rises above a predetermined safe value, the thermosensitive elements within the recesses 38 actuate the thermostatic control means to initiate the flow of fluid coolant through the ducts 40. The cooling of the sidewalls of the conduit 36 is thereby accelerated to prevent a temperature overswing in the material 12.

In this respect, it is to be noted that the coolant ducts 40 are somewhat centrally located between the heating elements 34 and the internal periphery of the conduit 36. Accordingly the heat flow from the elements 34 toward the plastic 12 will be conveyed from the conduit 36 by the coolant flowing within the ducts 40 before the plastic 12 is endangered. As the temperature of the conduit 36 falls below the danger point, the thermostat control system operates to stop the flow of coolant. Again at the proper temperature the heating elements 34 are energized to maintain the plastic 12 at the optimum temperature required for extrusion.

The temperature control described herein is preferably automatically actuated by thermostatic means having the thermosensitive elements within the sidewalls of the conduit 36. In other embodiments of the present invention, the thermosensitive elements may be located elsewhere, as for example within the thermoplastic material 12. Similarly, the heating elements 34 and coolant ducts 40 may be located elsewhere than within the sidewalls 36, as for example within the body of the plastic material 12 if desired.

The thermostatic control of the heating and cooling systems may be supplemented or replaced by a provision for manual control. Furthermore, it is to be observed that the present invention contemplates a temperature control by the cooperable interaction of the heating and cooling means. Accordingly, the temperature control may be achieved as described above by regulating both the heating and cooling elements, individually or simultaneously, or by regulating the heating means while the cooling means operates at a constant rate, or by regulating the cooling means while the output of the heating means remains constant.

Having thus described my invention, I claim:

1. In a temperature control means for a plastic fabricating machine, the combination of a conduit for plastic material and having thermally conductive sidewalls, heating means for said conduit in heat exchange relationship with the outer peripheral portions thereof, cooling means for said conduit and including a plurality of fluid coolant ducts within the body of the sidewalls of said conduit, said fluid coolant duct being positioned in said conduit radially inwardly of said heating means so as to be adaptable to cool the portions of said conduit which are heated by said heating means, and thermostatically actuated control means for coordinating the heating effect of said heating means and the cooling effect of said fluid coolant to maintain a controlled temperature on the plastic material in response to temperature changes in the sidewalls of said conduit.

2. The combination as claimed in claim 1 and being further characterized in that baffle means are provided within said coolant duct to retard the flow of coolant therethrough.

3. In a temperature control means for a plastic fabricating machine, the combination of a conduit having thermally conductive sidewalls for plastic material, heating means in heat exchange relation with the outer peripheral portions of said conduit, cooling means for said conduit and including a plurality of fluid coolant ducts within the body of the sidewalls of said conduit and adapted for selective connection with a fluid coolant circuit, said fluid coolant duct being positioned in said conduit radially inwardly of said heating means so as to be adaptable to cool the portions of said conduit which are heated by said heating means and an adjustable control for coordinating the heating effect of said heating means and the cooling effect of said cooling means to maintain a controlled temperature on the plastic material.

4. The combination as claimed in claim 3 and being further characterized in that said heating means comprise a plurality of electric strip heaters embedded within the peripheral surface of said conduit.

5. In a temperature control means for a plastic extrusion machine, the combination of a feed conduit having thermally conductive sidewalls for plastic material and communicating with an extrusion head, electric heating means in heat exchange relation with the outer peripheral portions of said feed conduit, cooling means for said conduit and including a system of fluid coolant ducts within the body of the sidewalls of said conduit and communicating with a supply of fluid coolant, said fluid coolant duct being positioned in said conduit radially inwardly of said heating means so as to be adaptable to cool the portions of said conduit which are heated by said heating means and thermostatically actuated control means having the thermosensitive elements thereof embedded within the sidewalls of said conduit for regulating the flow of current through said heater and the flow of coolant through said coolant ducts in response to the temperature of said sidewalls whereby the heating effect of said heating means and the cooling effect of said fluid coolant is coordinated to maintain a controlled temperature on the plastic material.

6. In a means for regulating the temperature of a thermoplastic material, the combination of longitudinally extending controlled heating means therefor, means to prevent overheating of said thermoplastic material including conduit means adapted for selective connection with a fluid coolant system for conveying a fluid coolant in thermal exchange relationship with said thermoplastic material, said heating means and said conduit means being in longitudinal juxtaposition so that they may be selectively operated either to heat or to cool the same portion of said thermoplastic material and means for regulating the temperature of said thermoplastic material including a thermostatically actuated control means for controlling said heating means and the selective flow of fluid coolant through said conduit means.

STEPHEN D. BRADLEY.

REFERENCES CITED

The following references are of record in the file of this patent:

UNITED STATES PATENTS

| Number | Name | Date |
|---|---|---|
| 1,370,800 | Egerton | Mar. 8, 1921 |

FOREIGN PATENTS

| Number | Country | Date |
|---|---|---|
| 401,428 | Great Britain | Nov. 16, 1933 |
| 507,926 | Great Britain | June 23, 1939 |
| 559,120 | Great Britain | Feb. 4, 1944 |